US012651867B2

(12) United States Patent
Iwatani

(10) Patent No.: US 12,651,867 B2
(45) Date of Patent: Jun. 9, 2026

(54) LEVER TYPE CONNECTOR AND CONNECTOR SYSTEM WITH LEVER TYPE CONNECTOR

(71) Applicant: Tyco Electronics Japan G.K., Kawasaki (JP)

(72) Inventor: Shingo Iwatani, Kawasaki (JP)

(73) Assignee: TE CONNECTIVITY JAPAN G.K., Kawasaki (JP)

( * ) Notice: Subject to any disclaimer, the term of this patent is extended or adjusted under 35 U.S.C. 154(b) by 221 days.

(21) Appl. No.: 17/824,247

(22) Filed: May 25, 2022

(65) Prior Publication Data

US 2022/0384993 A1 Dec. 1, 2022

(30) Foreign Application Priority Data

May 26, 2021 (JP) ................................ 2021-088622

(51) Int. Cl.

*H01R 13/502* (2006.01)
*H01R 13/629* (2006.01)
*H01R 13/639* (2006.01)

(52) U.S. Cl.

CPC ..... *H01R 13/62938* (2013.01); *H01R 13/502* (2013.01); *H01R 13/639* (2013.01)

(58) Field of Classification Search

CPC ............ H01R 13/502; H01R 13/62933; H01R 13/62938; H01R 13/639; H01R 13/629
USPC ........................................................ 174/94 R
See application file for complete search history.

(56) References Cited

U.S. PATENT DOCUMENTS

| | | | | |
|---|---|---|---|---|
| 5,709,560 A * | 1/1998 | Hio | .................. H01R 13/62933 | 439/157 |
| 8,439,695 B2 | 5/2013 | Komiyama et al. | | |
| 2003/0143886 A1* | 7/2003 | Nemoto | ........... H01R 13/62977 | 439/352 |
| 2008/0102668 A1* | 5/2008 | Ikeya | ..................... H01R 43/26 | 439/157 |

FOREIGN PATENT DOCUMENTS

| | | | | |
|---|---|---|---|---|
| DE | 102007051147 A1 | 4/2008 | | |
| JP | H0729764 U | 6/1995 | | |
| JP | 2006185772 A | 7/2006 | | |
| JP | 2010123395 A | * 6/2010 | ....... H01R 13/62933 | |
| JP | 2011134565 A | 7/2011 | | |
| JP | 2011204494 A | 10/2011 | | |
| JP | 2021-39842 A | 3/2021 | | |
| WO | 9512906 A1 | 5/1995 | | |
| WO | 2004093260 A1 | 10/2004 | | |
| WO | 2010058529 A1 | 5/2010 | | |

OTHER PUBLICATIONS

Extended European Search Report, Application No. 22175262.9-1201, Dated: Oct. 18, 2022, 11 pages.

(Continued)

*Primary Examiner* — Timothy J Thompson
*Assistant Examiner* — Guillermo J Egoavil

(57) ABSTRACT

A lever type connector includes a lever pivotally rotatable toward a mating connector. The lever performs both preliminary catching onto the mating connector and full catching onto the mating connector after the preliminary catching.

6 Claims, 13 Drawing Sheets

(56) References Cited

OTHER PUBLICATIONS

Japanese Office Action dated Jan. 28, 2025 with English translation, corresponding to Application No. 2021-088622, 9 pages.
European Patent Office Examination Report dated May 7, 2025, corresponding to Application No. 22 175 262.9-1201, 8 pages.
Reconsideration Report by Examiner before Appeal with English translation, Japanese Patent Application 2021-088622, issued Aug. 28, 2025, 8 pages.

* cited by examiner

LEVER TYPE CONNECTOR AND CONNECTOR SYSTEM WITH LEVER TYPE CONNECTOR

CROSS-REFERENCE TO RELATED APPLICATIONS

This application claims the benefit of the filing date under 35 U.S.C. § 119(a)-(d) of Japanese Patent Application No. 2021-088622, filed on May 26, 2021.

FIELD OF THE INVENTION

The present invention relates to a connector and, more particularly, to a connector having a lever.

BACKGROUND

A lever type connector for mating with a mating connector is conventionally known. For example, when a female connector and a mating male connector are required to be mated with a relatively great force, their mating can be achieved by a lever mounted in a pivotally-rotatable manner on the female connector.

By preliminary catching of a protrusion provided on a mating connector into a groove provided in a lever type connector at a predetermined location, both the connectors may be preliminarily mated and thus provisionally located. Further, the lever may be pivotally rotated to insert a protruding axial portion provided on the lever into a groove portion of the mating connector and thus cause them to catch together fully at a location different from the above preliminary catching portions, thereby completing mating of both the connectors.

In this case, if the positional accuracy of preliminary mating at the predetermined location of both the connectors is not high, specifically, if the positional accuracy of preliminary catching at the predetermined location of the protrusion provided on the mating connector and the groove provided in the lever type connector is not high, the following technical problem can occur. That is, at the location different from the preliminary mating portions, the protruding axial portion provided on the lever may be out of position and thus the protruding axial portion may fail to be inserted into the groove portion of the mating connector suitably. Consequently, it may be difficult to catch the protruding axial portion fully in the groove portion, which may cause a failure to mate both the connectors suitably by the lever.

SUMMARY

A lever type connector includes a lever pivotally rotatable toward a mating connector. The lever performs both preliminary catching onto the mating connector and full catching onto the mating connector after the preliminary catching.

BRIEF DESCRIPTION OF THE DRAWINGS

The invention will now be described by way of example with reference to the accompanying Figures, of which.

DETAILED DESCRIPTION OF THE EMBODIMENT(S)

Figure 1:
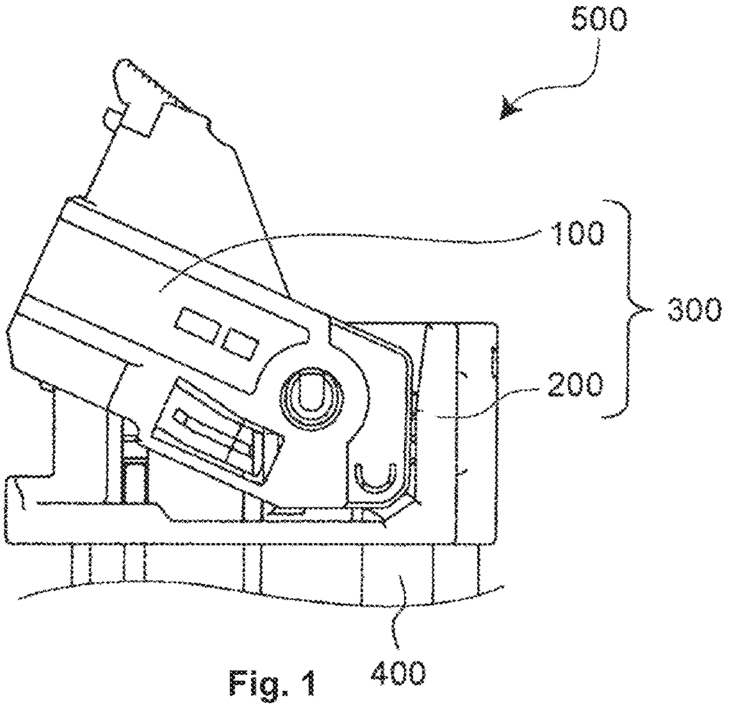
FIG. 1 is a schematic side view of a connector system of the present disclosure provided with a lever type connector (in the process of preliminary mating to a mating connector)

A lever type connector of the present disclosure and a connector system provided with the lever type connector will be described below with reference to the drawings. Various elements in the drawings are merely schematically and illustratively shown for descriptive purposes of the present disclosure, and their appearances or dimensional ratios in the drawings may be different from actual ones.

In addition, in the following description, terms indicating particular directions or positions will be used according to necessity. These terms, however, are used for facilitating understanding of the invention with reference to the drawings, and the meanings of these terms are not to limit the technical scope of the present disclosure. In addition, a portion denoted by the same reference sign in the drawings indicates the same or like portion.

The overall configuration of a connector system provided with a lever type connector of the present disclosure will be first described. Characteristic features of the present disclosure will be described later.

Figure 2:
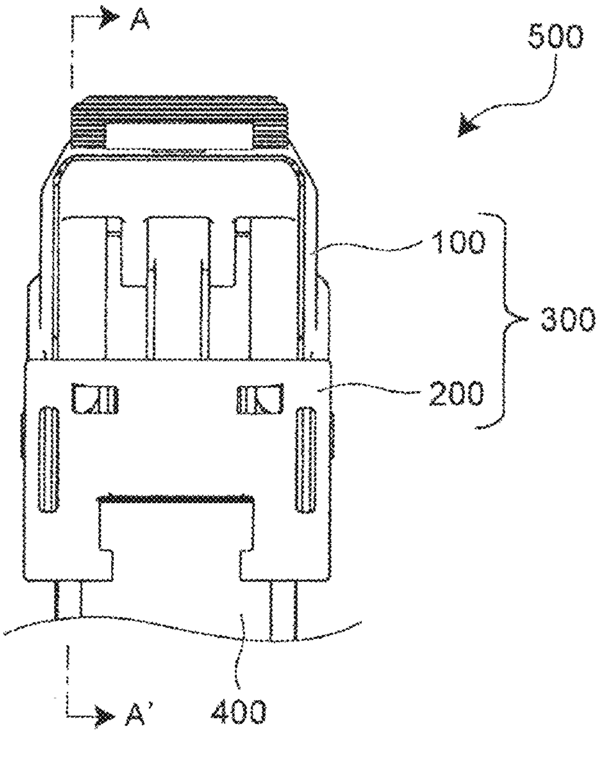
FIG. 2 is a schematic elevation of the connector system of the present disclosure provided with the lever type connector (in the process of preliminary mating to the mating connector)
Figure 3:
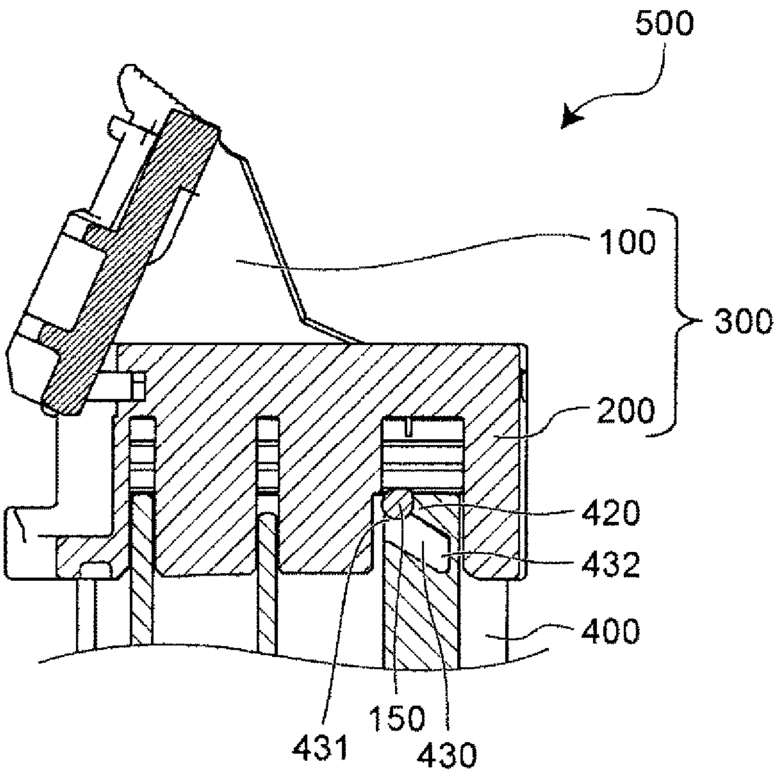
FIG. 3 is a schematic cross-sectional view of the connector system of the present disclosure provided with the lever type connector (in the process of preliminary mating to the mating connector), on a line A-A' in FIG. 2.

FIG. 1 is a schematic side view of a connector system of the present disclosure provided with a lever type connector (in the process of preliminary mating to a mating connector). FIG. 2 is a schematic elevation of the connector system of the present disclosure provided with the lever type connector (in the process of preliminary mating to the mating connector). FIG. 3 is a schematic cross-sectional view of the connector system of the present disclosure provided with the lever type connector (in the process of preliminary mating to the mating connector), on a line A-A' of FIG. 2.

As shown in FIGS. 1 to 3, a connector system 500 of the present disclosure is provided with a lever type connector 300 and a mating connector 400. The lever type connector 300 has a lever 100 and a connector 200.

Figure 4:
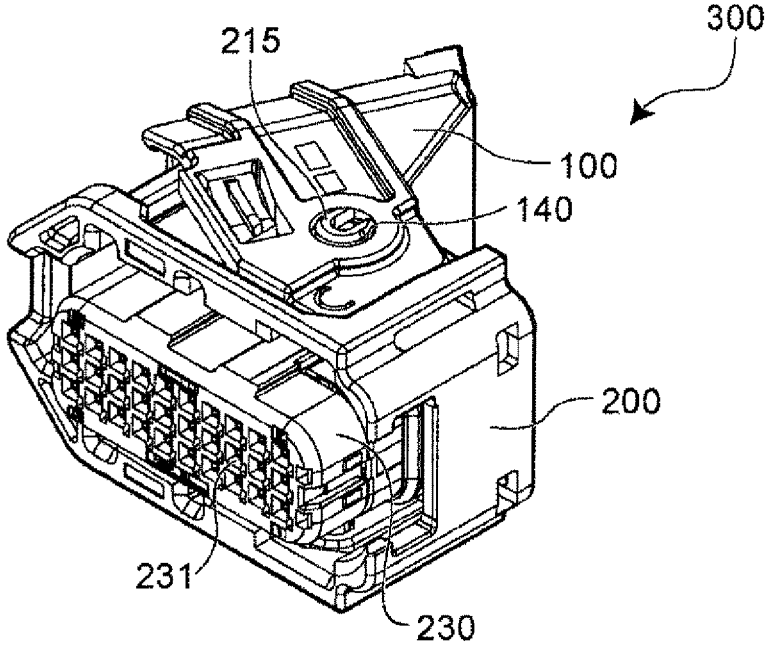
FIG. 4 is a schematic isometric view of the lever type connector of the present disclosure.
Figure 5:
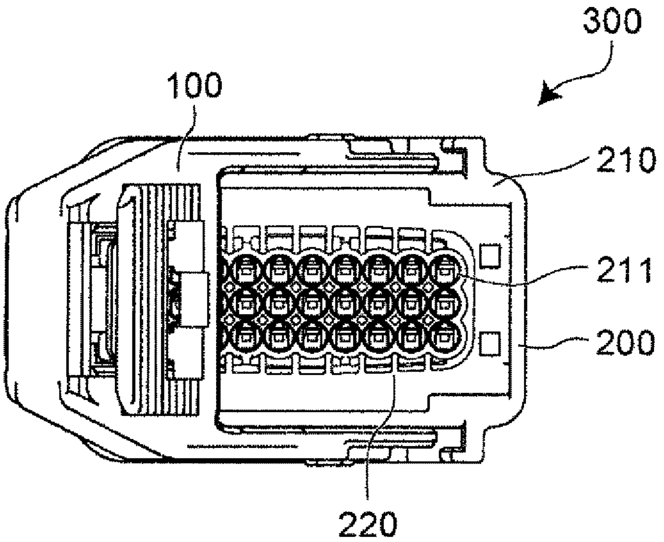
FIG. 5 is a schematic plan view of the lever type connector of the present disclosure.
Figure 6:
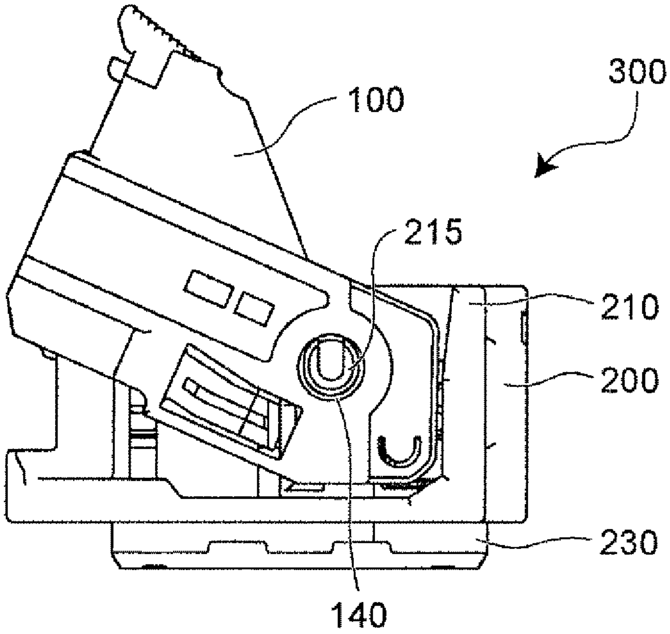
FIG. 6 is a schematic side view of the lever type connector of the present disclosure.
Figure 7:
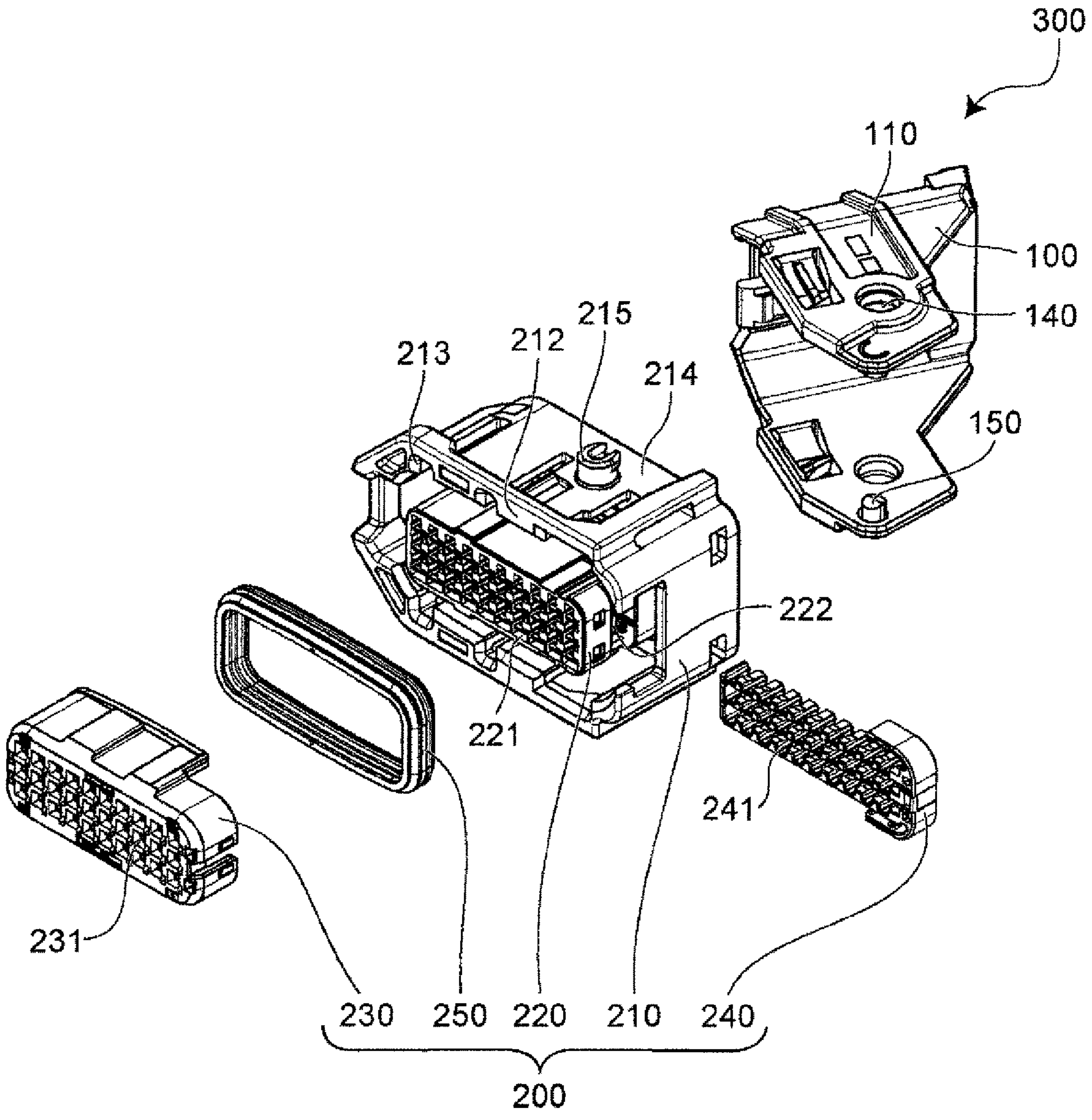
FIG. 7 is a schematic exploded isometric view of the lever type connector of the present disclosure.

FIG. 4 is a schematic isometric view of the lever type connector 300 of the present disclosure. FIG. 5 is a schematic plan view of the lever type connector 300 of the present disclosure. FIG. 6 is a schematic side view of the lever type connector 300 of the present disclosure. FIG. 7 is a schematic exploded isometric view of the lever type connector 300 of the present disclosure.

As shown in FIGS. 4 to 7, the connector 200 is provided with an outer housing 210, an inner housing 220 accommodating a plurality of contacts (for example, female contacts), a front housing 230, a retainer 240, and a seal member 250.

The inner housing 220 is made by injection molding of an insulating resin, and is provided with a plurality of contact accommodating cavities 221 shown in FIG. 7 passing therethrough in a front-rear direction. A contact is inserted into each contact accommodating cavity 221 in its longitudinal direction. A pair of latch portions for catching the outer housing 210 on the inner housing 220 may be provided on the inner housing 220, for example on its opposite ends.

The outer housing 210 is made by injection molding of an insulating resin, and is configured to accommodate the inner housing 220 and a major part of the front housing 230. The outer housing 210 is caught on the inner housing 220 by the latch portions provided on the inner housing 220.

This enables the seal member 250 to be pressed against the inner housing 220 between the inner housing 220 and the outer housing 210. The outer housing 210 has a plurality of through-holes 211, as shown in FIG. 5, provided therein that are formed in positions corresponding to the contact accommodating cavities 221 and a through-hole provided in the seal member 250. A wire connected to each contact is led out rearward through the through-hole 211 of the outer housing 210.

A groove portion 213 into which a protruding portion 440 provided on an outer side face 450 of the mating connector 400 can be inserted is formed in an inner side face 212 of the outer housing 210, as shown in FIG. 7. The protruding portion 440 of the mating connector 400 is inserted into such a groove portion 213 of the outer housing 210, thereby enabling the mating connector 400 to be assembled into the outer housing 210.

On the other hand, an axial portion 215 is provided on an outer side face 214 of the outer housing 210, as shown in FIGS. 4, 6, and 7. This axial portion 215 can be fitted into a through-hole 140 formed in a side portion 110 of the lever 100 described later.

The front housing 230 is made by injection molding of an insulating resin, and is so formed as to cover a front face of the inner housing 220 and to have a plurality of mating-contact insertion holes 231 extending longitudinally therethrough into which contacts of the mating connector 400 are inserted.

The retainer 240 is made by injection molding of an insulating resin, and is configured to be plugged into the inner housing 220. Specifically, the retainer 240 is configured to be plugged into a retainer accommodating recess 222 formed in the inner housing 10. The retainer 30 is provided with a plurality of contact passing-though holes 241 shown in FIG. 7 so formed as to correspond to the contact accommodating cavities 221 of the inner housing 220.

In addition, the retainer 240 is preliminarily retained by the inner housing 220 in a preliminary catching position where the contacts can be inserted into the contact accommodating cavities 221 through the contact passing-through holes 241, and is secured to the inner housing 220 in a full catching position where the retainer 240 is further pushed in. That is, the retainer 240 can locate the contact of the mating connector within the inner housing 400.

The seal member 250 is made by injection molding of an insulating resin, and is in the form of a ring closely attachable around the inner housing 220. When the mating connector 400 and the lever type connector 300 are mated together, the seal member 250 is configured to seal between a housing of the mating connector 400 and the inner housing 220 so that water entry into the inner housing 220 through their mating portions can be avoided.

Figure 8:
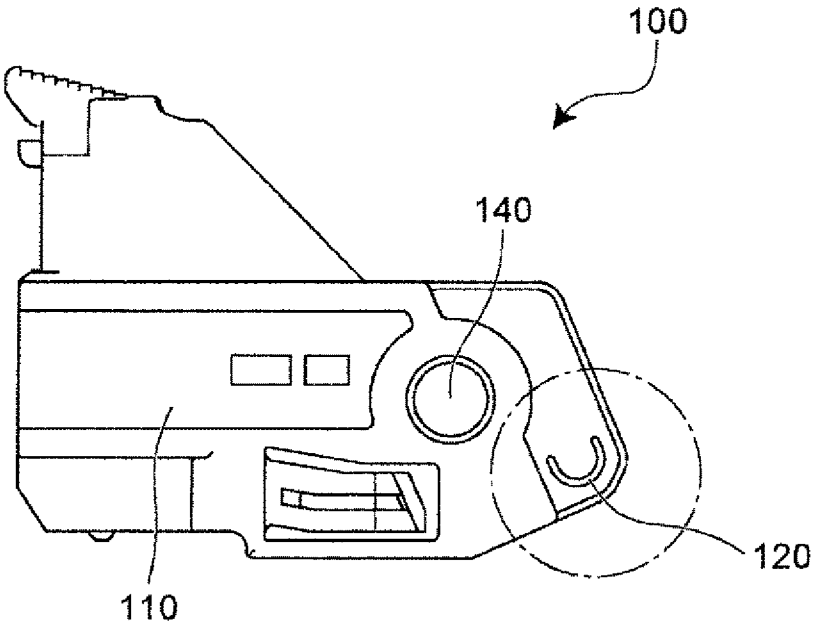
FIG. 8 is a schematic side view of the lever of the lever type connector of the present disclosure.
Figure 9:
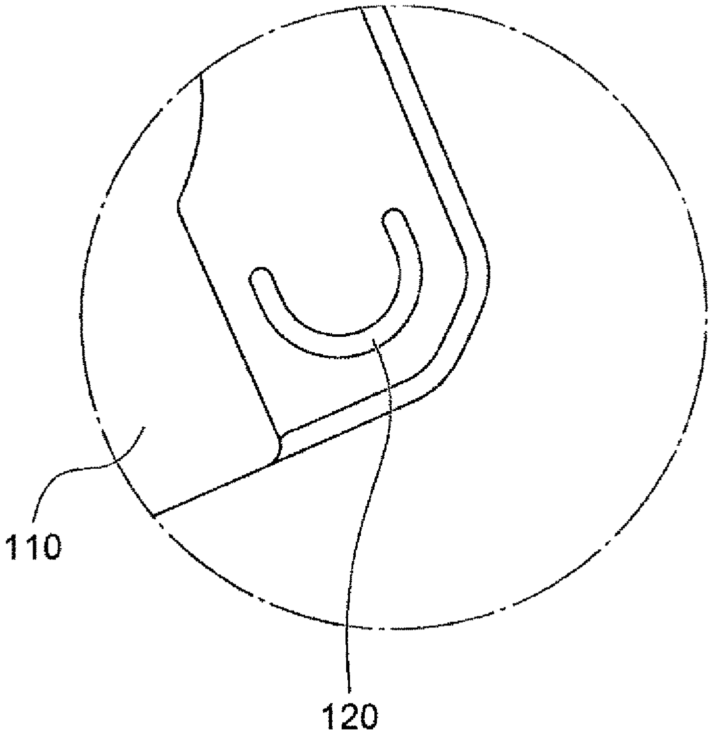
FIG. 9 is a schematic enlarged side view of a slit portion of the lever of the lever type connector of the present disclosure.
Figure 10:
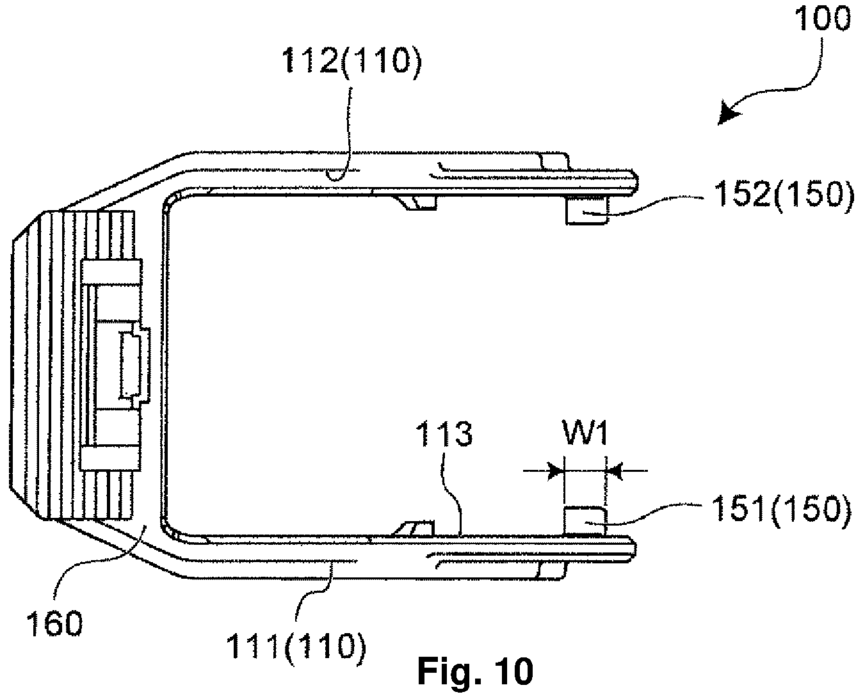
FIG. 10 is a schematic plan view of the lever of the lever type connector of the present disclosure.
Figure 11:
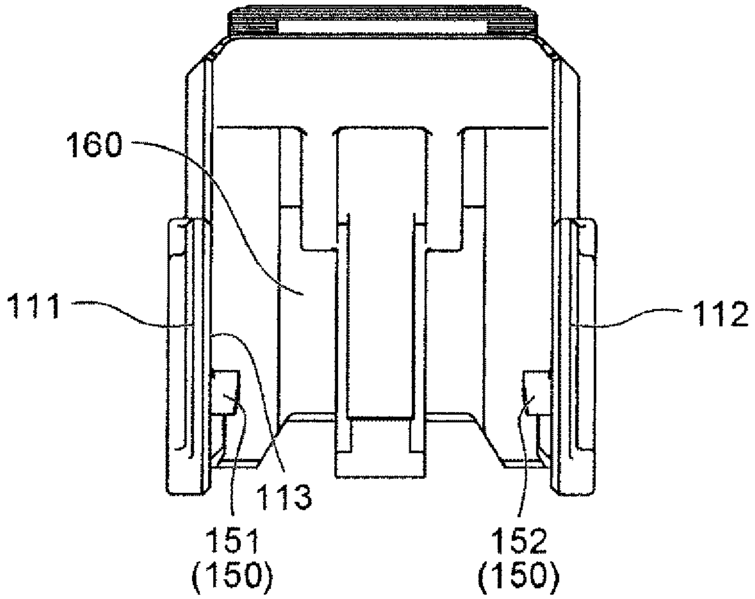
FIG. 11 is a schematic elevation of the lever of the lever type connector of the present disclosure.

FIG. 8 is a schematic side view of a lever 100 of the lever type connector 300 of the present disclosure. FIG. 9 is a schematic enlarged side view of a slit portion of the lever 100 of the lever type connector 300 of the present disclosure. FIG. 10 is a schematic plan view of the lever 100 of the lever type connector 300 of the present disclosure. FIG. 11 is a schematic elevation of the lever 100 of the lever type connector 300 of the present disclosure.

As shown in FIGS. 8, 10 and 11, the lever 100 is for assisting in mating the connector 200 and the mating connector 400. The lever 100 is made by injection molding of an insulating resin, and has a first side portion 111 and a second side portion 112 spaced from and opposite to each other with a coupling portion 160 therebetween. It should be noted that the two side portions are denoted herein by a reference sign 110 unless they are specifically distinguished. A through-hole 140 into which the axial portion of the outer housing 210 shown in FIG. 7 can be fitted is formed in this side portion 110. By such fitting, the lever 100 can be axially supported on the outer housing 210 of the connector 200 so as to be pivotally rotatable. That is, the lever 100 can be axially supported on the connector 200 so as to be pivotally rotatable.

It should be noted that the connector system 500 of the present disclosure may be further provided with a wire cover in addition to the lever type connector 300 and the mating connector 400 described above. The wire cover is made by injection molding of an insulating resin, and can protect a bundle of wires led out rearward from the contacts accommodated in the contact accommodating cavities 221 of the inner housing 220 through the respective through-holes 211 of the outer housing 210.

Figure 12:
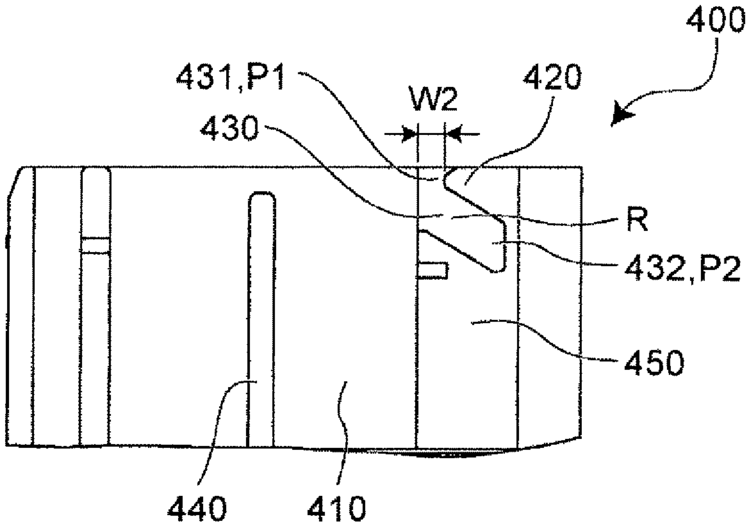
FIG. 12 is a schematic side view of the mating connector that is a component of the connector system of the present disclosure.
Figure 13:
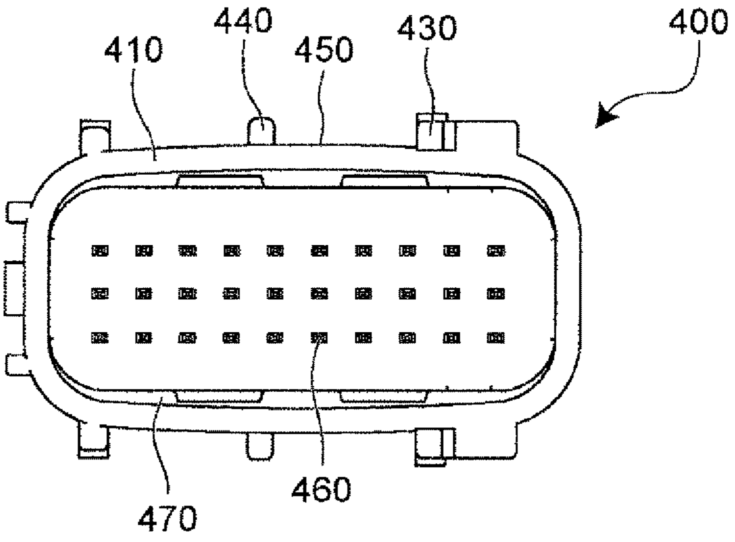
FIG. 13 is a schematic top view of the mating connector that is a component of the connector system of the present disclosure.
Figure 14:
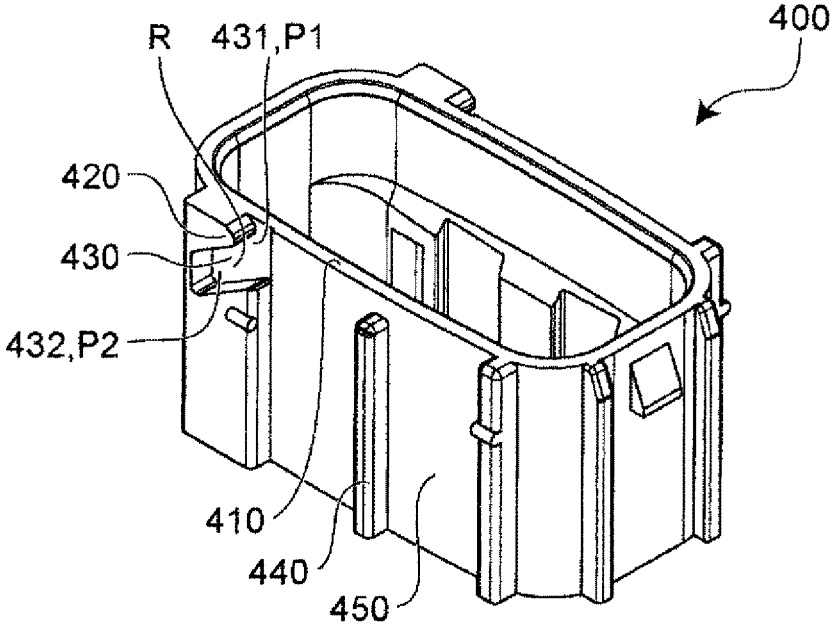
FIG. 14 is a schematic isometric view of the mating connector that is a component of the connector system of the present disclosure.
Figure 15:
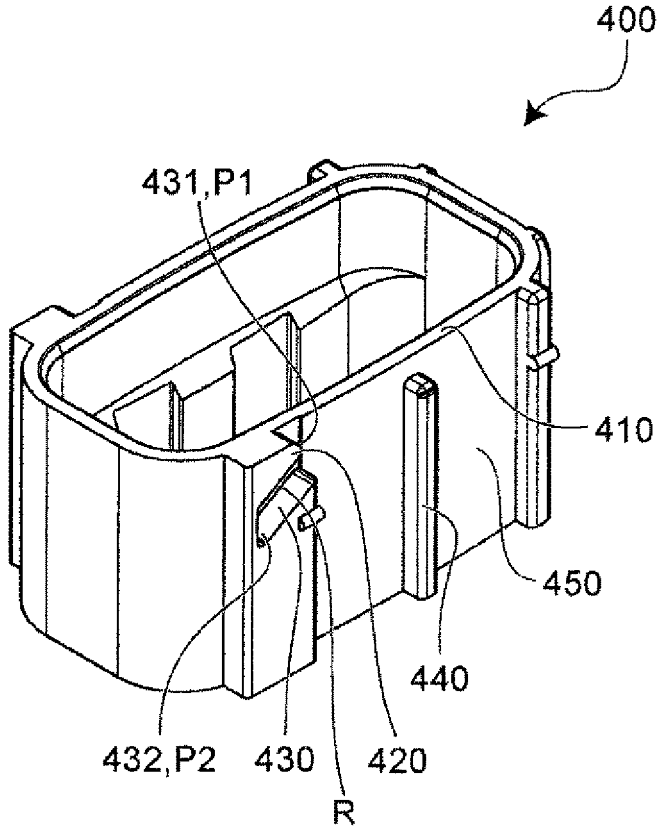
FIG. 15 is an isometric view of the mating connector that is a component of the connector system of the present disclosure, as viewed from a different angle from FIG. 14.

FIG. 12 is a schematic side view of the mating connector 400 that is a component of the connector system 500 of the present disclosure. FIG. 13 is a schematic plan view of the mating connector 400 that is a component of the connector system 500 of the present disclosure. FIG. 14 is a schematic isometric view of the mating connector 400 that is a component of the connector system 500 of the present disclosure. FIG. 15 is a schematic isometric view of the mating connector 400 that is a component of the connector system 500 of the present disclosure, as viewed from a different angle from FIG. 14.

As shown in FIGS. 12 to 15, the mating connector 400 is made by injection molding of an insulating resin. The mating connector 400 is provided with a side portion 410 in the form of an enclosure surrounding mating contacts 460, as viewed from above, and forming an opening portion 470 through which the mating contacts 460 can be exposed.

It should be noted that the insulating resin material used for the lever 100, each component of the connector 200, and the mating connector 400 may include, for example, at least one kind of thermosetting resin selected from the group consisting of a phenolic resin, an epoxy resin, a silicone resin, and an unsaturated polyester resin.

The present inventors have found that, when the position of a portion serving to mate a lever type connector and a mating connector preliminarily at a predetermined location and the position of a portion serving to mate both the connectors fully by a lever are different, if the positional accuracy of the preliminary mating is not high, a protruding axial portion provided on the lever may be out of position and thus the protruding axial portion may fail to be inserted into a groove portion of the mating connector, which results in a failure to mate (fully mate) both the connectors suitably by the lever.

In the present invention, the lever 100 pivotally rotatable toward the mating connector 400 enables both preliminary catching onto the mating connector 400 and full catching onto the mating connector 400 performed after the preliminary catching. Preliminary catching of the lever 100 onto the mating connector 400 and subsequent full catching of the lever 100 onto the mating connector 400 can be accurately performed in a simple way where the lever 100 is only moved in a pivotally-rotating manner. That is, both the preliminary catching and the full catching can be performed stepwise by only a pivotally-rotational movement of the lever 100.

A preliminary catching point where the preliminary catching is made by the lever 100 and a full catching point where the full catching is made by the lever 100 are continuous in the present invention. That is, a line connecting the preliminary catching point and the full catching point does not take a discontinuous form, but the full catching point is positioned on a line extended from the preliminary catching point, and thus both the preliminary catching and the full catching described above can be performed by only a pivotally-rotational movement of the lever 100.

According to the present disclosure, the lever type connector 300 can be mated with the mating connector 400 accurately in a simple way by the lever 100. Accordingly, the problem of the protruding axial portion of the lever being out of position and thus the protruding axial portion failing to be inserted into the groove portion of the mating connector can be avoided, which occurs when the position of a portion serving to mate the lever type connector and the mating connector preliminarily at a predetermined location and the position of a portion serving to mate both the connectors fully by the lever are different.

It should be noted that the definitions of terms as used herein are explained as follows. First, the term "lever type connector" refers to a connector having a lever connected thereto so as to be pivotally rotatable. The term "mating connector" as used herein refers to the other connector mateable with one lever type connector, and refers to a male connector when one lever type connector is a female connector, and vice versa. The term "lever" as used herein refers to a lever mechanism for providing a force to mate one connector with the other mating connector.

The term "pivotal rotation" as used herein refers to a rotation using a predetermined axially-supporting portion as a fulcrum, which is equivalent to a pivoting motion. The term "preliminary catching" as used herein refers to catching provisionally, and refers to catching that enables a subsequent predetermined motion. The term "preliminary catching point" as used herein refers to a portion, position or region where the above preliminary catching is performed. The term "full catching" as used herein refers to catching for achieving mating of connectors. The term "full catching point" as used herein refers to a portion, position or region where the above full catching is performed. The phrase "the preliminary catching point and the full catching point are continuous" as used herein refers to a line connecting the preliminary catching point and the full catching point taking a continuous form, and refers to the preliminary catching point and the full catching point themselves being not so continuous as to be in contact with each other.

In addition, the term "protruding axial portion" as used herein refers to an axial member configured to protrude from a predetermined face (for example a side face of the lever or a side face of the mating connector) so as to be movable in a groove portion. The term "groove portion" as used herein refers to an elongated depression, and refers to one opened at one side and closed at the other side. The term "protruding-axial-portion movement starting portion side" as used therein refers to a side (or region) from which the movement of the protruding axial portion in the groove portion starts, and refers to one side of the groove portion extending longitudinally. The term "protruding-axial-portion movement terminating portion side" refers to a side (or region) at which the movement of the protruding axial portion in the groove portion terminates, and refers to the other side of the groove portion extending longitudinally. The term "cross sectional contour of the protruding axial portion" refers to the contour of the protruding axial portion as viewed in cross section. The term "elastic member" as used herein refers to a member having flexibility and having the property of trying to return to its original shape.

A specific embodiment for realizing the technical idea of the present disclosure will be described below.

In an embodiment, the technical idea of the present disclosure is realizable when the above lever 100 has a first protruding axial portion 151 and a second protruding axial portion 152 on the inner side face 113 of its side portion 110 (see FIGS. 10 and 11, and the like) and the above mating connector 400 has a groove portion 430 allowing movement of the protruding axial portion 150 of the lever 100. It should be noted the two protruding axial portions 151, 152 are denoted herein by the reference sign 150 unless they are specifically distinguished.

In this case, the present disclosure has a characteristic where the groove portion 430 has a protruding-axial-portion movement starting portion side 431 and a protruding-axial-portion movement terminating portion side 432, and the former protruding-axial-portion movement starting portion side 431 is the above preliminary catching point, whereas the latter protruding-axial-portion movement terminating portion side 432 is the above full catching point.

According to such a characteristic, since the groove portion 430 has the form of a recess, a moving route of the protruding axial portion 150 of the lever 100 moving in the groove portion 430 can be controlled. Specifically, a moving route of the protruding axial portion 150 from the protruding-axial-portion movement starting portion side 431 of the groove portion 430 to the protruding-axial-portion movement terminating portion side 432, shown in FIG. 12, can be controlled along the form of the groove portion 430.

This enables the protruding axial portion 150 to be continuously moved along the form of the groove portion 430 from the protruding-axial-portion movement starting portion side 431 of the groove portion 430 that is the preliminary catching point to the protruding-axial-portion movement terminating portion side 432 that is the full catching point. This enables a state transition from a preliminary catching state of the protruding axial portion 150 into a full catching state of the protruding axial portion 150 to be continuously performed. Furthermore, since the protruding axial portion 150 is a component of the lever 100, a continuous movement of the protruding axial portion 150 is equivalent to a pivotally-rotational movement of the lever 100. Therefore, as described above, both the preliminary catching of the lever 100 onto the mating connector and the subsequent full catching of the lever 100 onto the mating connector 400 can be performed by only a pivotally-rotational movement of the lever 100.

It should be noted that the above description is made the assumption of a configuration where the lever 100 has the protruding axial portion 150, and the mating connector 400 has the groove portion 430 allowing movement of the protruding axial portion 150, but this is not a limitation.

Specifically, a configuration may be employed in which the mating connector 400 has a protruding axial portion, and the lever 100 has a groove portion allowing movement of the protruding axial portion of the mating connector 400. That is, in the present disclosure, one of the lever 100 and the mating connector 400 may have a protruding axial portion, and the other of the lever 100 and the mating connector 400 may have a groove portion allowing movement of the protruding axial portion.

The following description will be made on the assumption of the configuration where the lever 100 has the protruding axial portion 150, and the mating connector 400 has the groove portion 430 allowing movement of the protruding axial portion 150.

A way of achieving the preliminary catching of the protruding axial portion 150 of the lever 100 with respect to the protruding-axial-portion movement starting portion side 431 of the groove portion 430 will be described below.

In an embodiment, the protruding axial portion 150 of the lever 100 may be an elastic member, and a diametrical dimension W1 of the protruding axial portion 150 of the lever 100 should be relatively larger than a widthwise dimension W2 of the protruding-axial-portion movement starting portion 431 of the groove portion 430 (see FIGS. 10 and 12).

In order to provide the protruding axial portion 150 with an elastic function, as an example, a form having a slit 120 provided near a location where the protruding axial portion 150 is formed can be employed (see FIGS. 8 and 9). The slit 120 may be partially provided along the cross-sectional contour of the protruding axial portion 150 for ensuring a strength required for achieving the above preliminary catching. For example, in an embodiment, the slit 120 be provided along a lower half circular arc of the cross-sectional contour of the protruding axial portion 150.

In addition, the protruding axial portion 150 of the lever 100 is an elastic member, and the diametrical dimension W1 of the protruding axial portion 150 having this elastic function is relatively larger than the widthwise dimension W2 of the protruding-axial-portion movement starting portion 431 of the groove portion 430. Therefore, when a pivotal rotation of the lever 100 causes the protruding axial portion 150 of the lever 100 to enter the protruding-axial-portion movement starting portion 431 of the groove portion 430, the protruding axial portion 150 deflects temporarily due to its elastic property so that it can be located in the protruding-axial-portion movement starting portion 431 smaller in diametrical dimension than the protruding axial portion 150, and thereafter tries to return its original shape due to the elastic property of the protruding axial portion 150 so that the protruding axial portion 150 and a portion 420 (corresponding to a local region of the side portion 410) forming the protruding-axial-portion movement starting portion side 431 can achieve a mutually-abutting state. In this manner, the preliminary catching of the protruding axial portion 150 of the lever 100 on the protruding-axial-portion movement starting portion side 431 of the groove portion 430 can be achieved.

It should be noted that the widthwise dimension of the groove portion 430 be smallest at the protruding-axial-portion movement starting portion side 431 for achieving the temporary deflected state of the protruding axial portion 150 suitably, and that the widthwise dimension except in the portion side 431 be larger than the widthwise dimension at the protruding-axial-portion movement starting portion side 431 so that the protruding axial portion 150 can slide therein.

In addition, the above description is made on the assumption that the protruding axial portion 150 of the lever 100 has an elastic function, but this is not a limitation, and at least one of the protruding axial portion 150 of the lever 100 and the portion 420 (corresponding to a local region of the side portion 410) forming the protruding-axial-portion movement starting portion side 431 of the groove portion 430 may be an elastic member. Specifically, the protruding axial portion 150 of the lever 100, the portion 420 (corresponding to a local region of the side portion 410) forming the protruding-axial-portion movement starting portion side 431 of the groove portion 430, or both of them may have an elastic function.

A use of the connector system 500 of the present disclosure will be described below.

Step 1: Stage Before Preliminary Mating of Lever Type Connector 300 to Mating Connector 400

Figure 16:
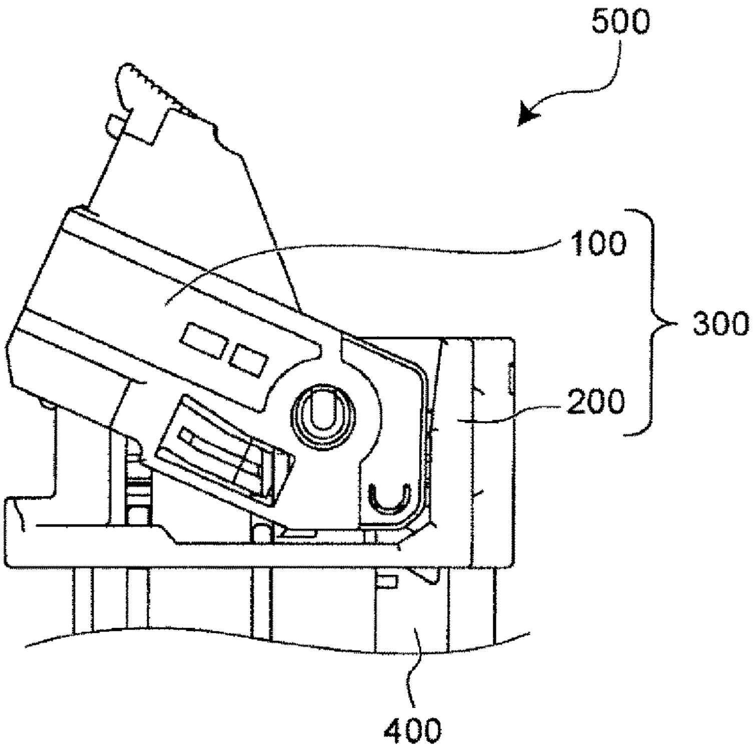
FIG. 16 is a schematic side view of the connector system of the present disclosure provided with the lever type connector (before preliminary mating to the mating connector)
Figure 17:
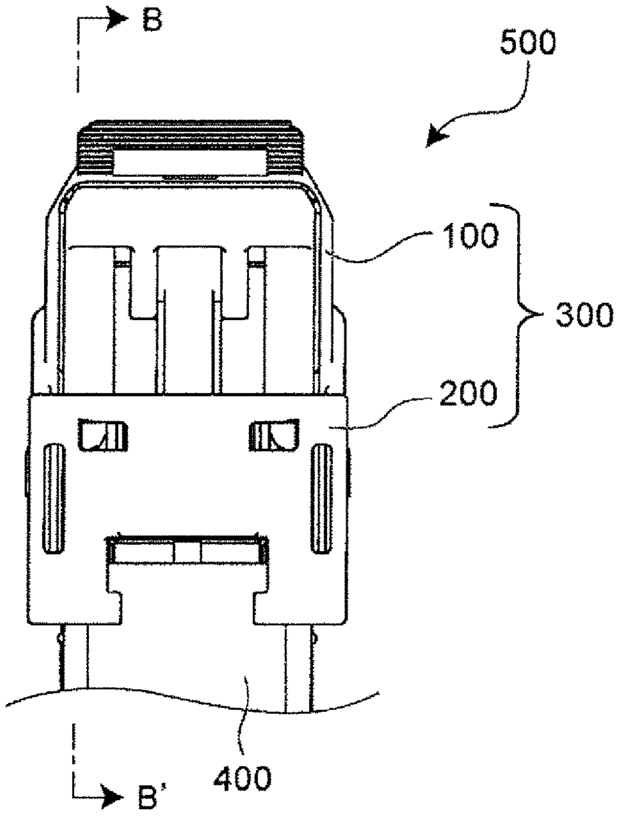
FIG. 17 is a schematic elevation of the connector system of the present disclosure provided with the lever type connector (before preliminary mating to the mating connector)
Figure 18:
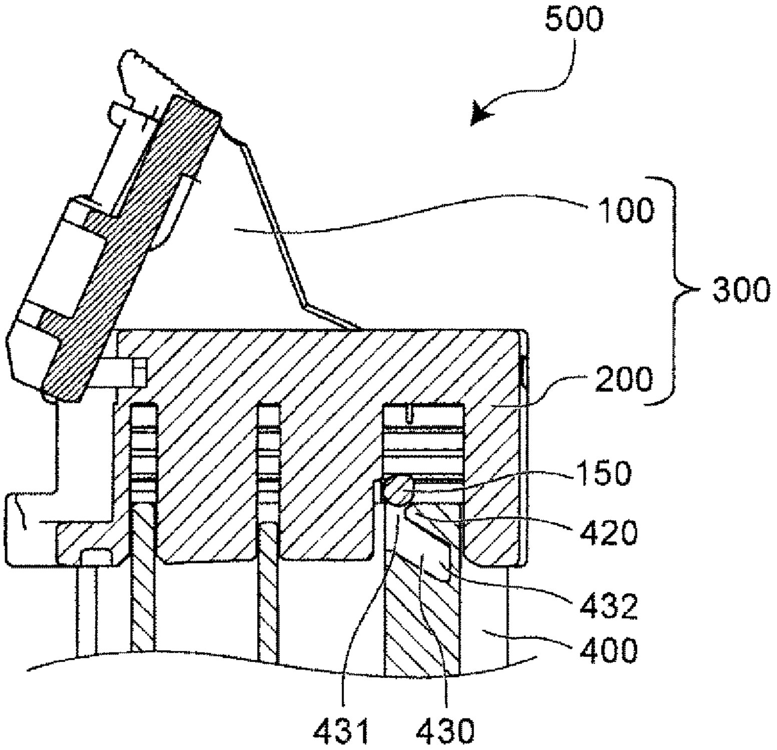
FIG. 18 is a schematic cross-sectional view of the connector system of the present disclosure provided with the lever type connector (before preliminary mating to the mating connector), on a line B-B' in FIG. 17.

FIG. 16 is a schematic side view of the connector system 500 of the present disclosure provided with the lever type connector 300 (before preliminary mating to the mating connector 400). FIG. 17 is a schematic elevation of the connector system 500 of the present disclosure provided with the lever type connector 300 (before preliminary mating to the mating connector 400). FIG. 18 is a schematic cross-sectional view of the connector system 500 of the present disclosure provided with the lever type connector 300 (before preliminary mating to the mating connector 400), on a line B-B' in FIG. 17.

At the step 1, first, insertion of the mating connector 400 positioned at a predetermined location into the lever type connector 300 is started. Specifically, insertion of the protruding portion 440 formed on the outer side face 450 of the mating connector 400 along the groove portion 213 formed in the inner side face 212 of the outer housing 210 is started. Continuing such insertion enables the mating connector 400 to be assembled into the outer housing 210, and finally the insertion at the predetermined location into the lever type connector 300 is completed.

When such insertion is completed, in the present disclosure, as shown in FIG. 18, the protruding axial portion 150 of the lever 100 that is a component of the lever type connector 300 can be positioned slightly above the protruding-axial-portion movement starting portion 431 of the groove portion 430. Specifically, the protruding axial portion 150 of the lever 100 can be positioned in such a position as not to abut on the portion 420 forming the protruding-axial-portion movement stating portion side 431. In addition, when the above insertion is completed, the lever 100 is in a state before a pivotal rotation.

Also from the above, at the present step 1, the protruding axial portion 150 of the lever 100 is in a state before preliminary catching on the protruding-axial-portion movement starting portion side 431 of the mating connector 400. That is, at the present step 1, as shown in FIGS. 16 and 17, the lever type connector 300 is in a state before preliminary mating with the mating connector 400.

Step 2: Stage in Process of Preliminary Mating of Lever Type Connector 300 to Mating Connector 400

FIG. 1 is a schematic side view of the connector system 500 of the present disclosure provided with the lever type connector 300 (in the process of preliminary mating to the mating connector 400). FIG. 2 is a schematic elevation of the connector system 500 of the present disclosure provide with the lever type connector 300 (in the process of preliminary mating to the mating connector 400). FIG. 3 is a schematic cross-sectional view of the connector system 500 of the present disclosure provided with the lever type connector 300 (in the process of preliminary mating to the mating connector 400), on a line A-A' in FIG. 2.

At the step 2, from the state before a pivotal rotation of the lever 100 at the step 1, a pivotal rotation of the lever 100 is started. Starting such a rotation causes the protruding axial portion 150 of the lever 100 to move to the protruding-axial-portion movement starting portion 431 of the groove portion 430 of the mating connector 400. Here, as described above, the protruding-axial-portion 150 of the lever 100 is an elastic member, and the diametrical dimension W1 of the protruding axial portion 150 having an elastic function is relatively larger than the widthwise dimension W2 of the protruding-axial-portion movement starting portion 431 of the groove portion 430.

Therefore, as shown in FIG. 3, the protruding axial portion 150 deflects temporarily due to its elastic property so that it can be located at the protruding-axial-portion movement starting portion 431 smaller in diametrical dimension than the protruding axial portion 150. It should be noted, at the present step 2, since the protruding axial portion 150 is in a temporary deflected state due to its elastic property, the protruding axial portion 150 of the lever 100 is in the process of preliminary catching on the protruding-axial-portion movement starting portion side 431 of the mating connector 400. That is, at the present step 2, as shown in FIGS. 1 and 2, the lever type connector 300 is in the process of preliminary mating to the mating connector 400.

Step 3: Stage at Completion of Preliminary Mating of Lever Type Connector 300 to Mating Connector 400

Figure 19:
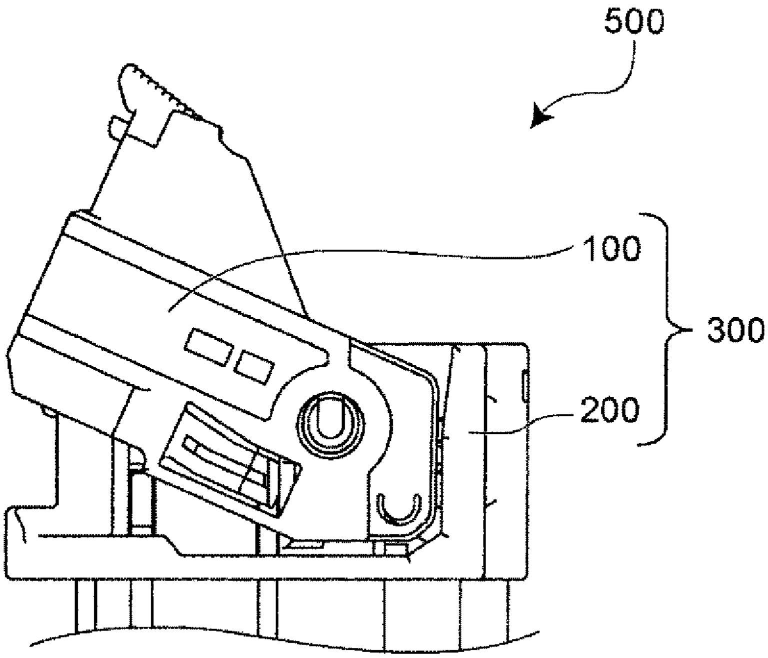
FIG. 19 is a schematic side view of the connector system of the present disclosure provided with the lever type connector (at the completion of preliminary mating to the mating connector)
Figure 20:
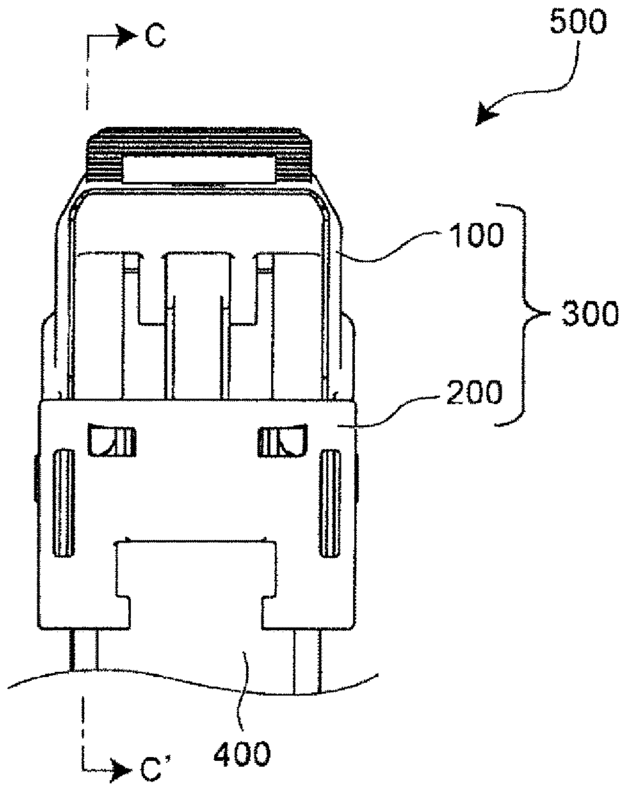
FIG. 20 is a schematic elevation of the connector system of the present disclosure provided with the lever type connector (at the completion of preliminary mating to the mating connector)
Figure 21:
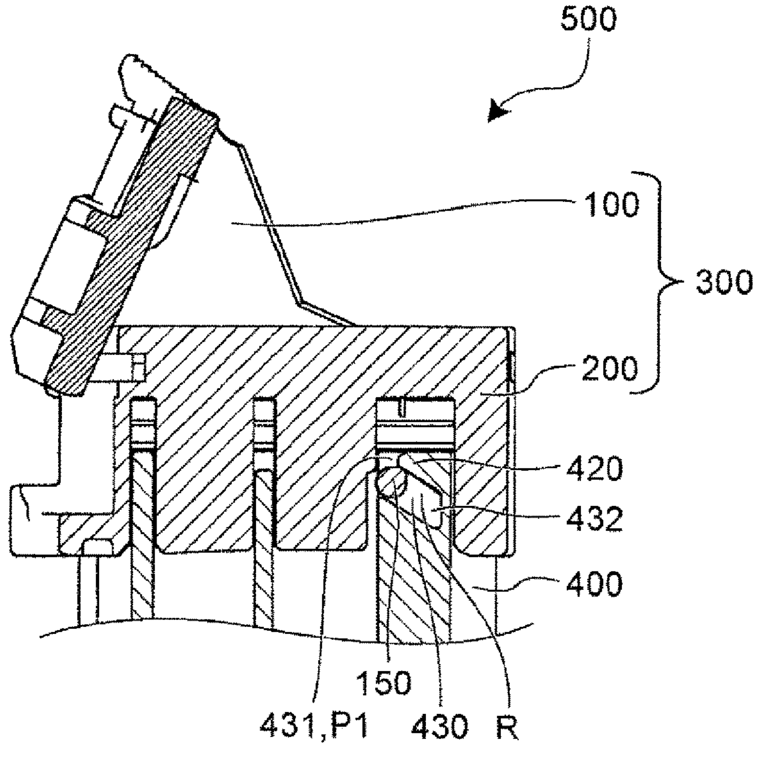
FIG. 21 is a schematic cross-sectional view of the connector system of the present disclosure provided with the lever type connector (at the completion of preliminary mating to the mating connector), on a line C-C' in FIG. 20.

FIG. 19 is a schematic side view of the connector system 500 of the present disclosure provided with the lever type connector 300 (at the completion of preliminary mating to the mating connector 400). FIG. 20 is a schematic elevation of the connector system 500 of the present disclosure provided with the lever type connector 300 (at the completion of preliminary mating to the mating connector 400). FIG. 21 is a schematic cross-sectional view of the connector system 500 of the present disclosure provided with the lever type connector 300 (at the completion of preliminary mating to the mating connector 400), on a line C-C' in FIG. 20.

At the step 3, from the pivot-starting state of the lever 100 at the step 2, a further pivotal rotation of the same lever 100 is performed. Such a rotation, as shown in FIG. 21, causes the protruding axial portion 150 to try to return to its original shape due to its elastic property, and thereby the protruding axial portion 150 and the portion 420 (corresponding to a local region of the side portion 410) forming the protruding-axial-portion movement starting portion side 431 can achieve a mutually-abutting state. In this manner, the preliminary catching of the protruding axial portion 150 of the lever 100 on the protruding-axial-portion movement starting portion side 431 of the groove portion 430 can be suitably achieved. That is, at the step 3, as shown in FIGS. 19 and 20, the lever type connector 300 is in a state before preliminary mating to the mating connector 400.

Step 4: Stage of Full Mating of Lever Type Connector 300 with Mating Connector 400

Figure 22:
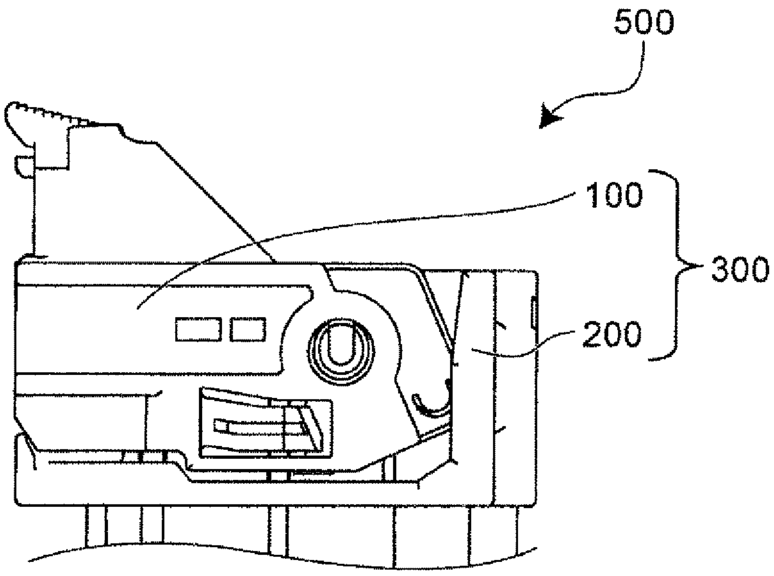
FIG. 22 is a schematic side view of the connector system of the present disclosure provided with the lever type connector (at the time of full mating to the mating connector)
Figure 23:
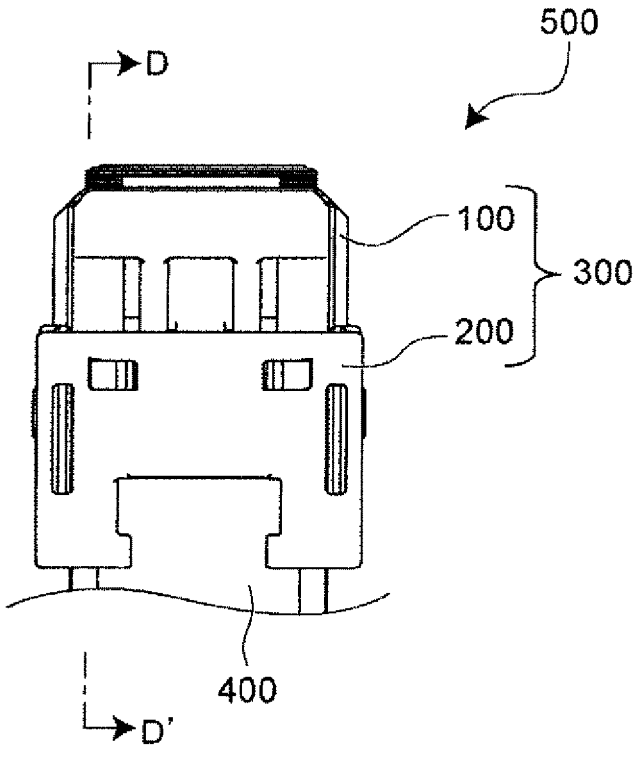
FIG. 23 is a schematic elevation of the connector system of the present disclosure provided with the lever type connector (at the time of full mating to the mating connector)
Figure 24:
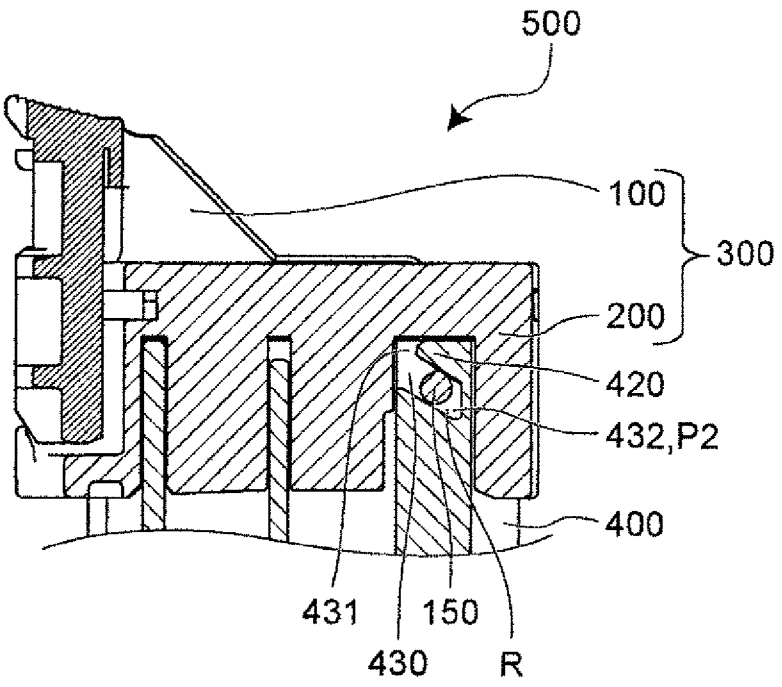
FIG. 24 is a schematic cross-sectional view of the connector system of the present disclosure provided with the lever type connector (at the time of full mating to the mating connector), on a line D-D' in FIG. 23.

FIG. 22 is a schematic side view of the connector system 500 of the present disclosure provided with the lever type connector 300 (at the time of full mating to the mating connector 400). FIG. 23 is a schematic elevation of the connector system 500 of the present disclosure provided with the lever type connector 300 (at the time of full mating to the mating connector 400). FIG. 24 is a schematic cross-sectional view of the connector system 500 of the present disclosure provided with the lever type connector 300 (at the time of full mating to the mating connector 400), on a line D-D' in FIG. 23.

At the step 4, from the pivotally-rotated state of the lever 100 at the step 3, a further pivotal rotation of the same lever 100 is performed. Such a rotation, as shown in FIG. 24, causes the protruding axial portion 150 of the lever 100 to slide toward the protruding-axial-portion movement terminating portion side 432 along the form of the groove portion 430. Thereafter, when sliding of the protruding axial portion 150 of the lever 100 to the protruding-axial-portion movement terminating portion side 432 is completed, the full catching of the protruding axial portion 150 of the lever 100 can be suitably achieved on the protruding-axial-portion movement terminating portion side 431 of the groove portion 430. That is, at the present step 4, as shown in FIGS. 22 and 23, the lever type connector 300 is in a state of being fully mated to the mating connector 400.

Also from the above, according to the use of the connector system 500 of the present disclosure, the preliminary catching of the lever 100 onto the mating connector 400 and the subsequent full catching of the lever 100 onto the mating connector 400 can be accurately performed in a simple way where the lever 100 is only moved in a pivotally-rotating manner. That is, both the preliminary catching and the full catching can be performed by only a pivotally-rotational movement of the lever 100.

Though the present disclosure has been described above, only a typical example in the scope of application of the present disclosure is illustrated.

A lever type connector of the present disclosure and a connector system provided with the lever type connector are suitably applicable to an electronic substrate requiring an electrical connection.

What is claimed is:

1. A lever type connector, comprising:

a lever pivotally rotatable toward a mating connector, the lever being configured to perform both a preliminary catching onto the mating connector and a full catching onto the mating connector after the preliminary catching, one of the lever and the mating connector having a protruding axial portion and the other of the lever and the mating connector having a groove portion along which the protruding axial portion moves;

a movement starting portion side of the groove portion being a preliminary catching point where the preliminary catching is made by the lever, the protruding axial portion enters the groove portion to engage in the preliminary catching by an initial rotation of the lever; and a diametrical dimension of the protruding axial portion being larger than a widthwise dimension of a portion of the groove portion forming the movement starting portion side, the lever having a slit near the protruding axial portion forming the protruding axial portion as an elastic member, wherein the preliminary catching point where the preliminary catching is made by the lever and a full catching point where the full catching is made by the lever are continuous, and wherein a movement terminating portion side of the groove portion is the full catching point.

2. The lever type connector of claim 1, wherein both the preliminary catching and the full catching can be performed stepwise by only the pivotally-rotational movement of the lever.

3. The lever type connector of claim 1, wherein a moving route of the protruding axial portion from the movement starting portion side to the movement terminating portion side is controlled along a form of the groove portion.

4. The lever type connector of claim 1, wherein the slit is partially disposed along a cross-sectional contour of the protruding axial portion.

5. A connector system, comprising:

a mating connector; and a lever type connector having a lever pivotally rotatable toward the mating connector, the lever being configured to perform both a preliminary catching onto the mating connector and a full catching onto the mating connector after the preliminary catching, one of the lever and the mating connector having a protruding axial portion and the other of the lever and the mating connector having a groove portion along which the protruding axial portion moves, a movement starting portion side of the groove portion being a preliminary catching point where the preliminary catching is made by the lever, the protruding axial portion enters the groove portion to engage in the preliminary catching by an initial rotation of the lever, and a diametrical dimension of the protruding axial portion being larger than a widthwise dimension of a portion of the groove portion forming the movement starting portion side, the lever having a slit near the protruding axial portion forming the protruding axial portion as an elastic member, the preliminary catching point where the preliminary catching is made by the lever and a full catching point where the full catching is made by the lever are continuous, a movement terminating portion side of the groove portion is the full catching point.

6. A lever type connector, comprising:

a lever pivotally rotatable toward a mating connector, the lever being configured to perform both a preliminary catching onto the mating connector and a full catching onto the mating connector after the preliminary catching, one of the lever and the mating connector having a protruding axial portion and the other of the lever and the mating connector having a groove portion along which the protruding axial portion moves;

a movement starting portion side of the groove portion being a preliminary catching point where the preliminary catching is made by the lever; and a diametrical dimension of the protruding axial portion being larger than a widthwise dimension of a portion of the groove portion forming the movement starting portion side, the lever having a slit near the protruding axial portion forming the protruding axial portion as an elastic member, the slit is partially disposed along a cross-sectional contour of the protruding axial portion, wherein the preliminary catching point where the preliminary catching is made by the lever and a full catching point where the full catching is made by the lever are continuous, and wherein a movement terminating portion side of the groove portion is the full catching point.

* * * * *